United States Patent [19]

Clements et al.

[11] Patent Number: 5,386,851

[45] Date of Patent: Feb. 7, 1995

[54] TWO DIMENSIONAL MODULATED BURNER STAGING VALVE

[75] Inventors: Martin A. Clements; Robert M. Darby, both of Cincinnati, Ohio

[73] Assignee: General Electric Company, Cincinnati, Ohio

[21] Appl. No.: 180,519

[22] Filed: Jan. 12, 1994

Related U.S. Application Data

[63] Continuation of Ser. No. 84,648, Jun. 28, 1993, abandoned.

[51] Int. Cl.⁶ .................... F16K 11/078; F02C 1/00
[52] U.S. Cl. .................... 137/625.17; 251/31; 60/746
[58] Field of Search .................... 137/625.17, 488; 251/31; 60/746

[56] References Cited

U.S. PATENT DOCUMENTS

| | | | |
|---|---|---|---|
| 4,580,602 | 4/1986 | Boody | 137/625.17 |
| 4,676,141 | 6/1987 | Park | 137/625.17 |
| 4,852,348 | 8/1989 | Allard et al. | 60/746 X |
| 4,967,796 | 11/1990 | Meyer | 137/625.17 X |
| 5,129,222 | 7/1992 | Lampe et al. | 60/746 X |

OTHER PUBLICATIONS

Fuel Control for GE's T700 Engine and CT7 Engine—Schematic from CT7 Turboprop Engine HMU Component Maintenance Manual SEI-720, Mar. 1990.
Augmentor Fuel Control for GE's F101/F110 Engines—Schematic from Controls O&S Manual GEK 72540 (Chapter 4), Date Unknown.

*Primary Examiner*—John Rivell
*Attorney, Agent, or Firm*—Bernard E. Shay; Jerome C. Squillaro

[57] ABSTRACT

A fuel valve comprising main fuel valve connected to a burner staging valve such that fuel flow from the main fuel valve is divided between pilot and main domes in a dual annular combustor. The burner staging valve includes a movable spool located within a fixed sleeve such that the spool may be moved both laterally and rotated within predetermined limits. The movable spool and sleeve include pilot, main and inlet windows arranged such that the inlet windows receive fuel from the main fuel valve and the pilot and main windows split the fuel flow between the pilot and main domes of the combustor.

5 Claims, 5 Drawing Sheets

TWO DIMENSIONAL MODULATED BURNER STAGING VALVE

This application is a continuation of application Ser. No. 08/084,648, filed Jun. 28, 1993, now abandoned.

The present invention relates, in general to fuel metering valves and more particularly to an improved two dimensional fuel metering valve for metering fuel to a dual annular combustor.

BACKGROUND OF THE INVENTION

Gas Turbine engines may utilize a dual annular combustion system which consists of an outer (pilot) dome and an inner (main) dome. In a dual annular combustor, fuel is supplied to fuel nozzles in both the pilot dome and the main dome. In controlling fuel flow to the main and a pilot domes, it is essential to ensure that flow is properly allocated over a wide range of total fuel flows. Control of the distribution of engine fuel flow between the two domes enables the combustor performance to be optimized for particular engine operating conditions. For example, the fuel split between the domes can be selected to minimize the emissions of the engine and protect the engine operability limits (i.e. flameout and temperature limits). The distribution of fuel between the main and pilot domes may be controlled as a function of typical engine parameters (e.g., total fuel flow, inlet temperature or pressure).

One such scheme for providing the variable flow split of a fully modulated burner staging valve is described in U.S. Pat. No. 4,691,730. The flow divider, presented in U.S. Pat. No. 4,691,730 uses a flow control (or divider) valve and a pressurizing/backpressure equalizing shuttle valve. The flow control valve is operated as a function of the desired flow split. Reliable and accurate flow splits can be expected for a 4:1 inlet flow range. Typically, in gas turbine engines, minimum to maximum total fuel flow will have a range of approximately 60:1. It would, therefore, be advantageous to design a burner staging valve capable of accurate flow splits for variations in total flow in the range of approximately 60:1.

Flow split is also important because a flow split biased to give too much flow to either zone of the combustor will result in a skewed temperature profile in the high pressure turbine at the combustor outlet. A skewed temperature distribution is undesirable. At lower power levels an incorrectly biased fuel flow split could allow the fuel to air ratio in one of the domes to be too low to maintain combustion. At high power levels an incorrectly biased fuel flow split could result in localized overheating in the turbine. Therefore, it would be advantageous to design a failsafe burner staging valve to prevent these problems.

SUMMARY OF THE INVENTION

A fuel valve according to the present invention comprises main fuel valve connected to a burner staging valve such that fuel flow from the main fuel valve is divided between pilot and main domes in a dual annular combustor. The burner staging valve includes a movable spool located within a fixed sleeve such that the spool may be moved both laterally and rotated within predetermined limits. The movable spool and sleeve include pilot, main and inlet windows arranged such that the inlet windows receive fuel from the main fuel valve and the pilot and main windows split the fuel flow between the pilot and main domes of the combustor.

The burner staging spool being movable within the sleeve, the spool may be adjusted to change the area of the window openings. The windows are designed such that relative movement of the spool moves the spool windows over the sleeve windows and changes the area of the opening to the main and pilot domes. The sleeve windows may, according to the present invention, comprise groups of small, metering windows adapted to provide predetermined fuel splits for specified spool positions. Finally, the movement of the spool is constrained and the windows are arranged to provide failsafe operation of the burner staging valve in the event of a failure of the control system.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

Figure 1:
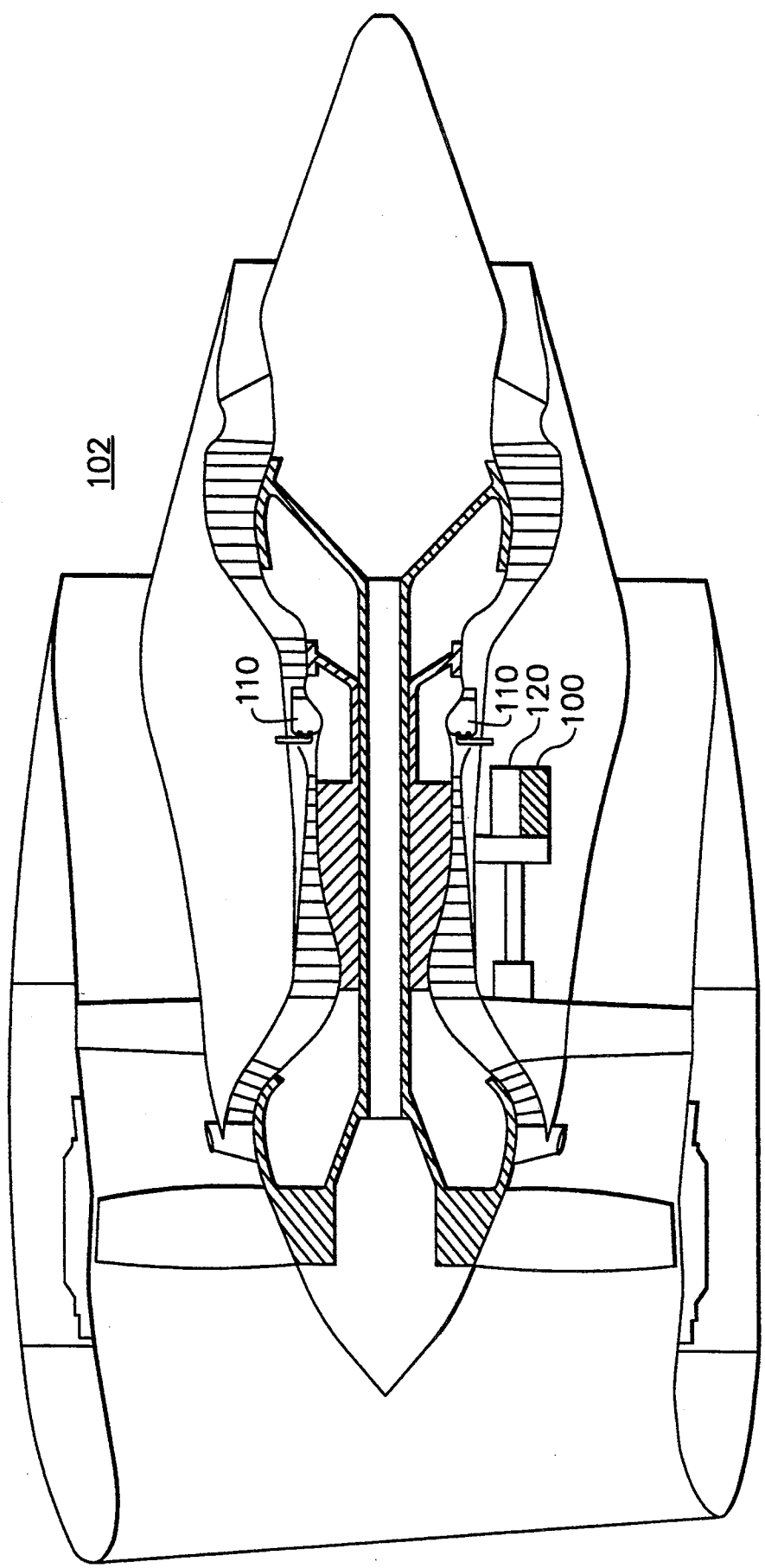
FIG. 1 is a cut away view of turbine engine including a burner staging valve according to the present invention.

FIG. 1 illustrates a dual annular combustor gas turbine engine 102 including a Hydromechanical Unit (HMU) 100. HMU 100 is adapted to supply fuel to combustor 110. HMU 100 receives fuel from fuel pump 120. HMU 100 includes a fuel metering system for controlling fuel flow to combustor 110 and for dividing fuel flow between main and pilot domes. The fuel metering system may be comprised of a total flow metering valve and a burner staging valve (BSV) according to the present invention.

Figure 2:
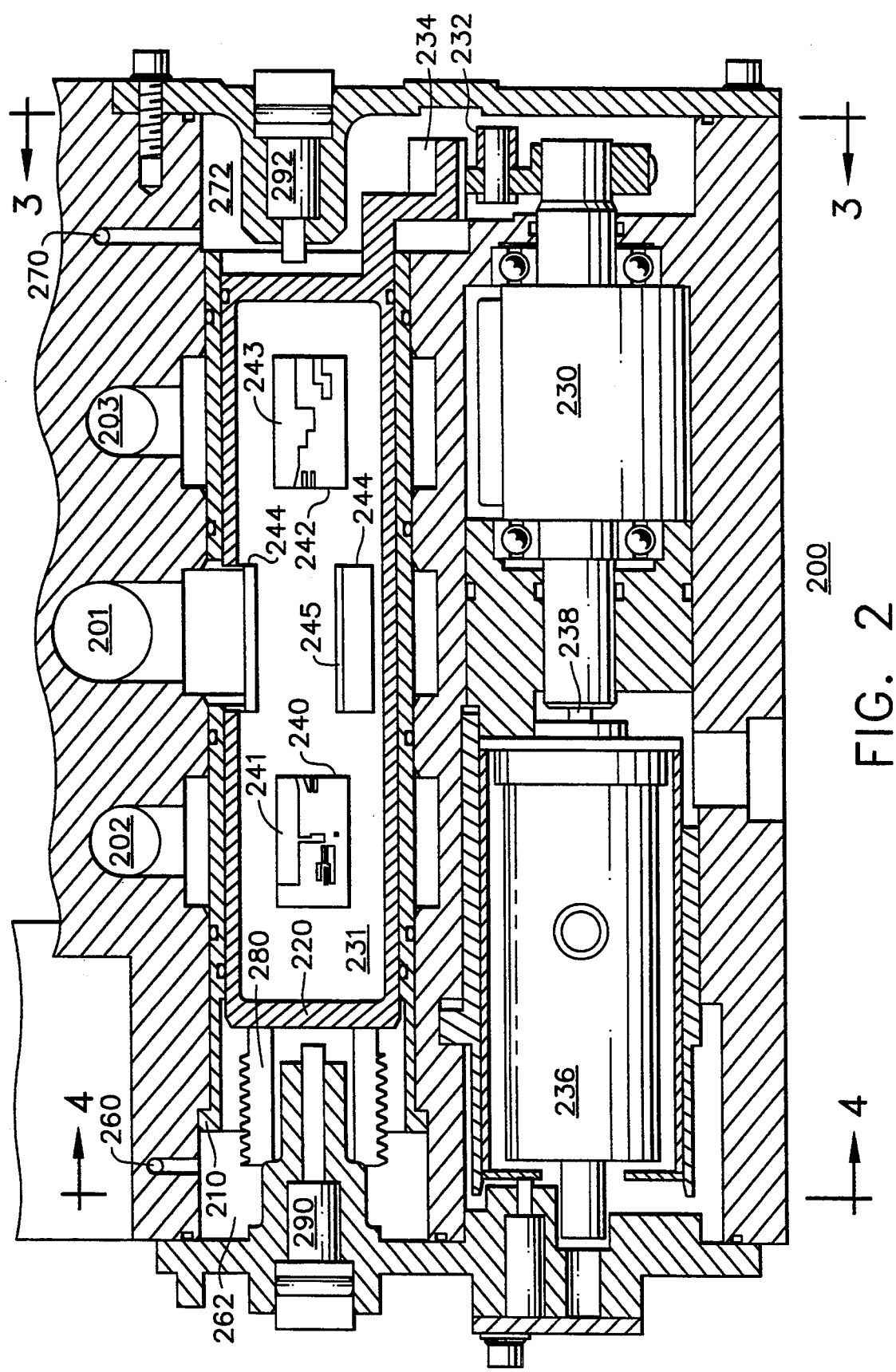
FIG. 2 illustrates a burner staging valve according to the present invention.

FIG. 2 illustrates a fuel metering system 200 according to the present invention. Fuel metering system 200 in FIG. 2, includes a total flow metering valve 230 and a burner staging valve 231. Burner staging valve 231 includes burner staging sleeve 210, a burner staging spool 220 and burner staging valve rotational gear 234. Burner staging sleeve 210 is connected to a pilot port 202 through sleeve pilot windows 241, main port 203 through sleeve main windows 243 and inlet port 201 through sleeve inlet windows 245. Burner staging spool 220 includes spool pilot windows 240, spool main windows 242 and spool inlet windows 244. First pressure input 260 and second pressure input 270 are connected to first cavity 262 and second cavity 272 respectively at either end of burner staging spool 220 to provide translational input to burner staging spool 220.

In FIG. 2, metering valve position feedback device 236 (e.g. a position feedback resolver) is connected to total flow metering valve through coupling 238. Metering position feedback device 236 is adapted to provide rotational position feedback and total fuel flow signals to an electronic control (not shown) for scheduling flow splits. Resolver rack 280 is connected to spool 220 to provide translational feedback as illustrated in FIG. 4.

Figure 3:
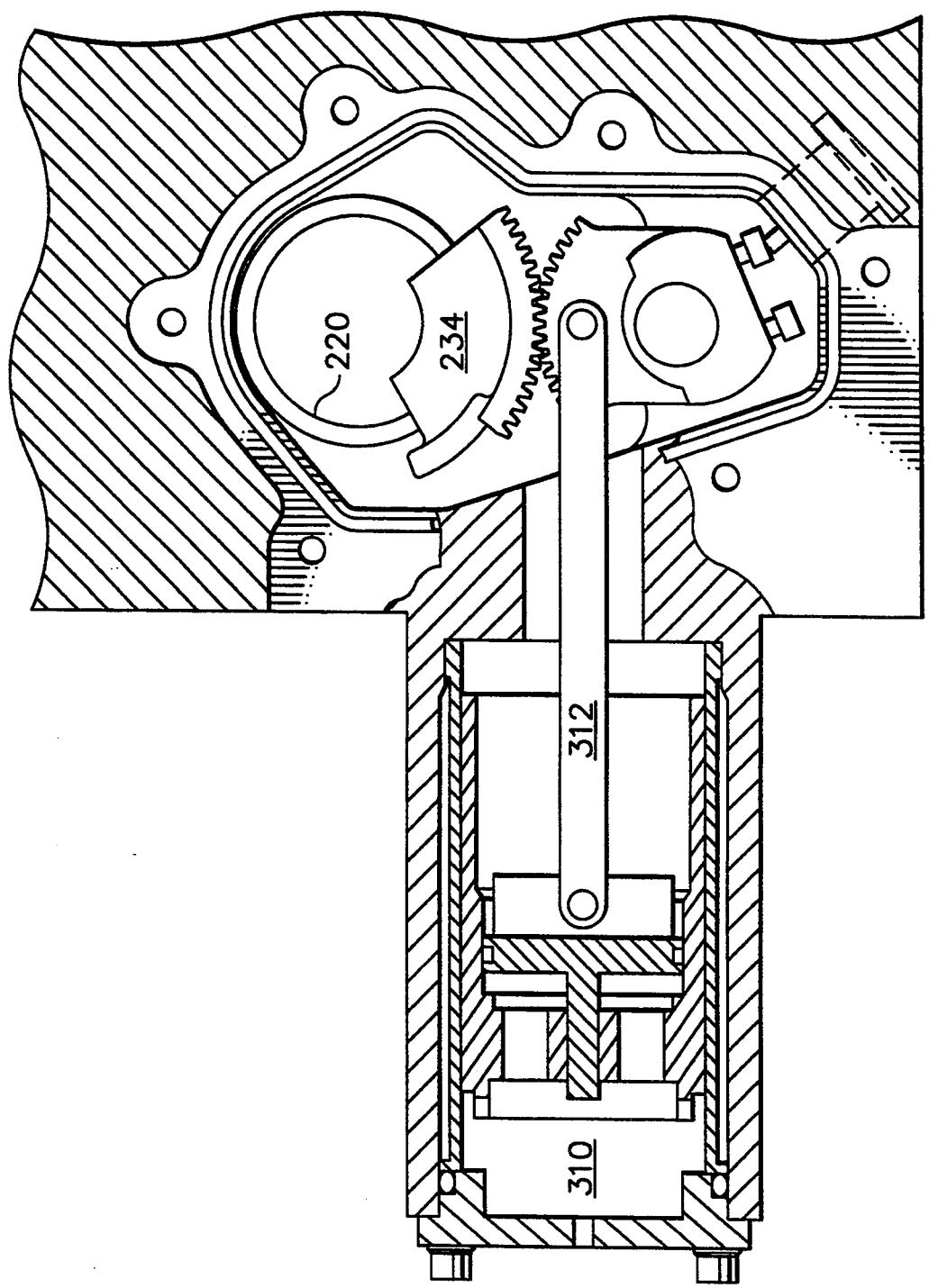
FIG. 3 is a cutaway end view of the rotational connection between the total flow metering valve and the burner staging spool in the valve illustrated in FIG. 2.

FIG. 3 illustrates the rotational connection between total flow metering valve 230 and burner staging spool 220. Burner staging valve rotational gear 234 meshes with total flow metering valve rotational gear 232 to form the rotational connection. Servo actuator 310 is connected to gear 232 through linkage 312 to provide rotational input to burner staging spool 220. In addition, servo actuator 310 controls the position of total flow metering valve 230 and, thus total fuel flow to be split by burner staging valve 231.

Figure 4:
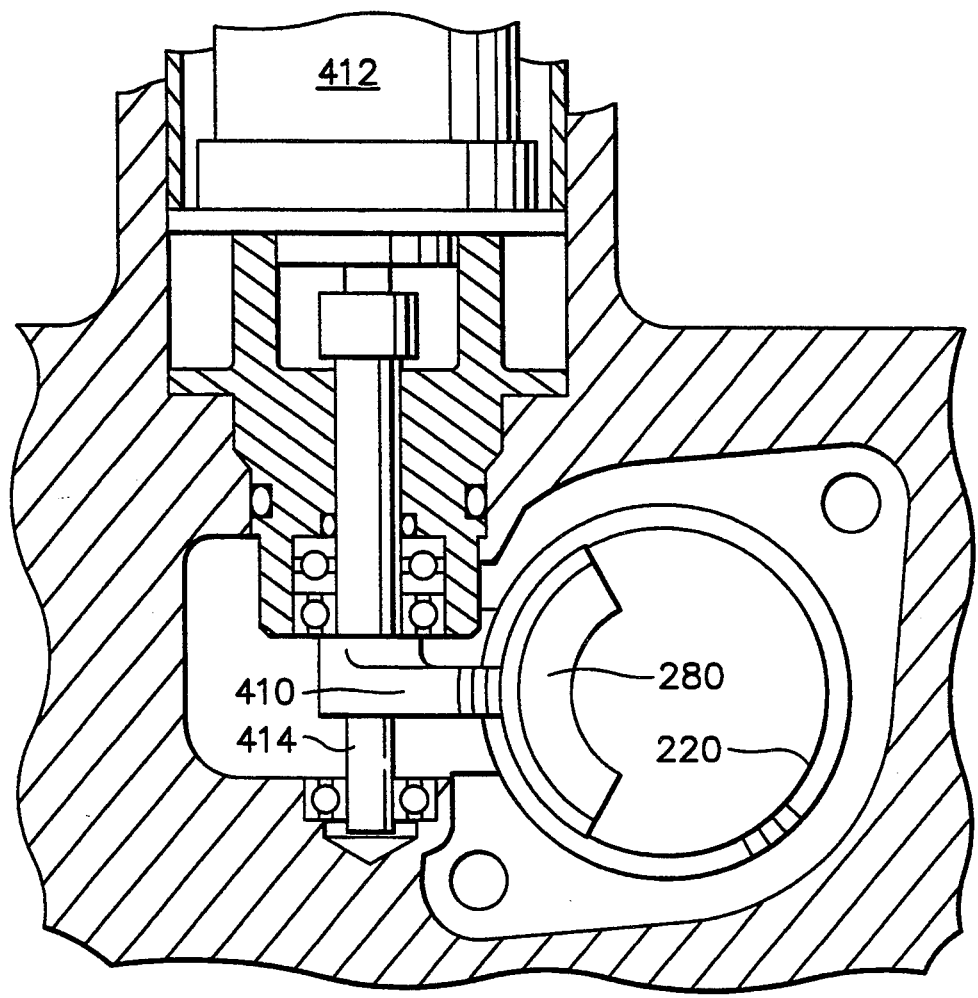
FIG. 4 is a cut away end view of the translation feedback mechanism of the burner staging spool in the valve illustrated in FIG. 2.

FIG. 4 illustrates the translation feedback mechanism of the burner staging spool in the valve illustrated in FIG. 2. In FIG. 4, resolver rack 280 is affixed to spool 220 to provide translational feedback through sector gear 410. Sector gear 410 is connected to burner staging spool position feed back device (such as the feedback device 236) through shaft 414.

Figure 5:
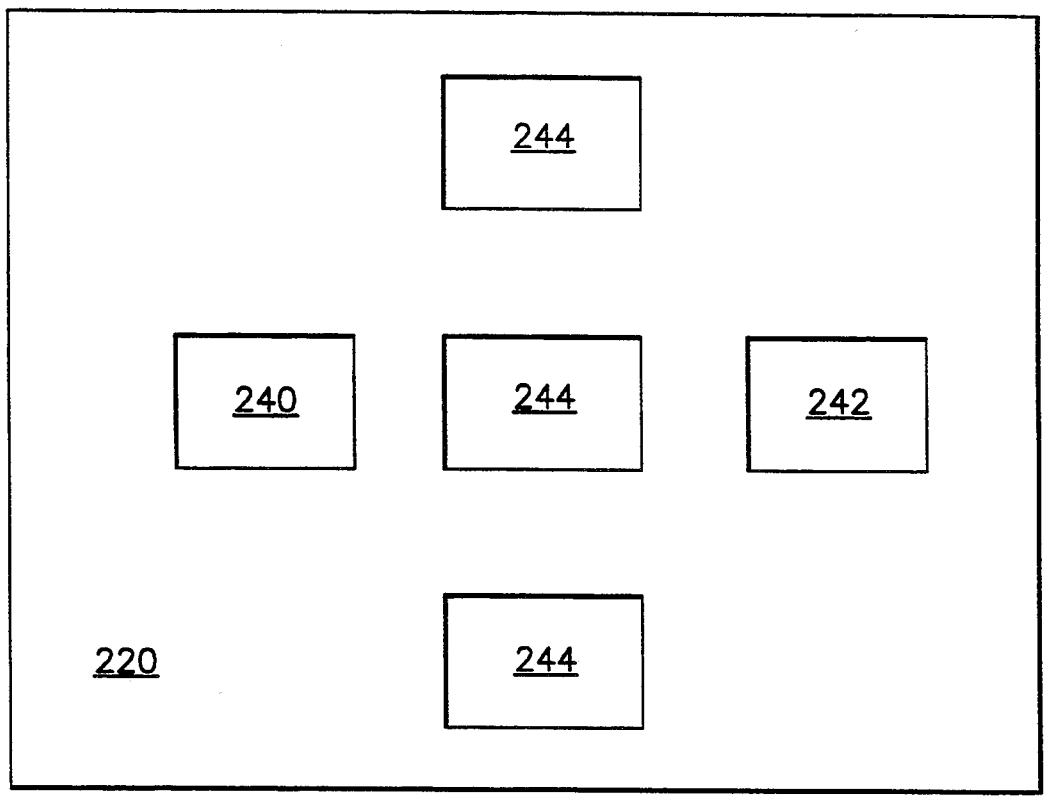
FIG. 5 illustrates a typical port configuration for the burner staging spool for the valve illustrated in FIG. 2.
Figure 6:
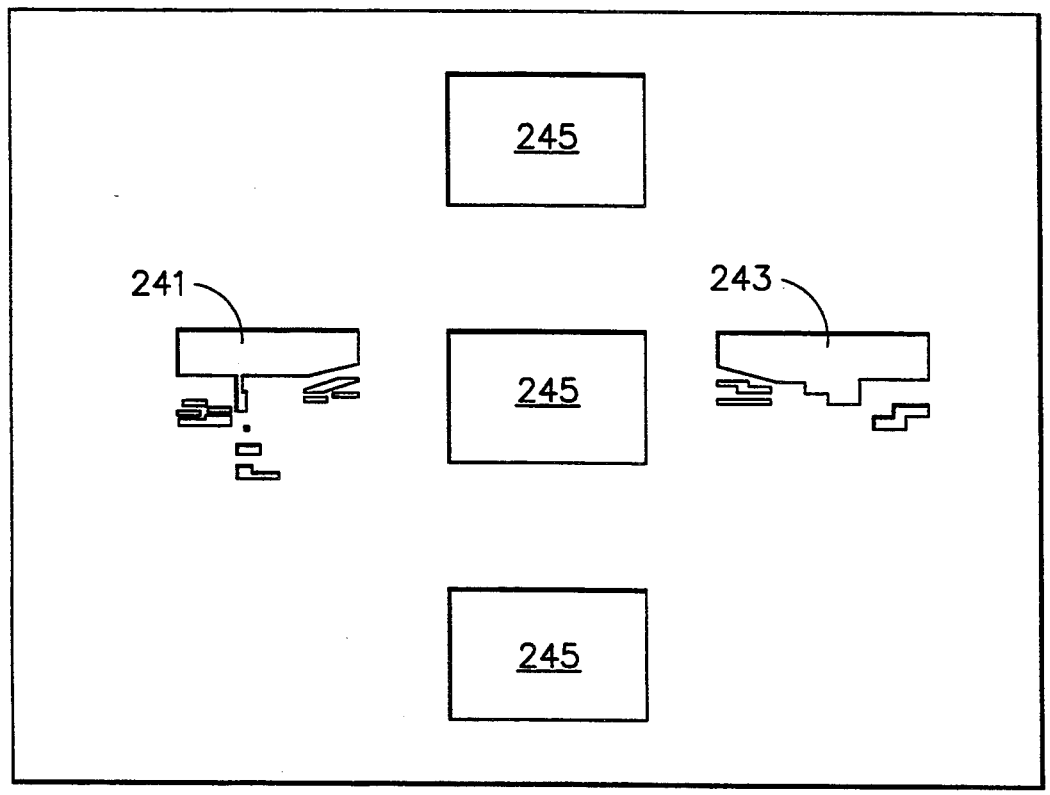
FIG. 6 illustrates a typical port configuration for the burner staging sleeve for the valve illustrated in FIG. 2.

FIG. 5 illustrates a typical port configuration for burner staging spool 220 including spool pilot window 240, spool main window 242 and spool inlet windows 244. FIG. 6 illustrates a typical port configuration for burner staging sleeve 210 including sleeve pilot windows 241, sleeve main windows 243 and sleeve inlet windows 245.

In the embodiment of the invention illustrated in FIG. 2, inlet port 201 receives fuel from total flow metering valve 230 which receives fuel from fuel pump 120. Pilot port 202 supplies fuel to a pilot dome via a pilot manifold (not shown). Main port 203 supplies fuel to a main dome via a main manifold (not shown). In FIG. 2, burner staging valve 231 includes movable burner staging spool 220 within burner staging sleeve 210. Staging spool 220 is translated laterally by changing the relative pressure at first cavity 262 and second cavity 272. The relative pressure in cavities 262 and 272 may be adjusted by varying the pressure at pressure inputs 260 and 270, using, for example, a regulated pressure at one input (e.g. input 260) and an electronically controlled servovalve to regulate the pressure at the other input (e.g. input 270).

Rotational control of the position of spool 220 may be achieved by moving servo actuator 310. Actuator 310 is rotationally connected to spool 220 through linkage 312 and rotational gears 232 and 234.

Fuel Flow to the pilot and main domes is a function of the window area opened by moving spool 220 with respect to sleeve 210. Flow split between the pilot and main domes is, therefore, controlled by rotational and translational positioning of the windows in spool 220 over the windows in sleeve 210. By accurately positioning spool 220 the net window areas available to flow fuel to pilot port 202 and main port 203 may be adjusted to vary the flow split between the pilot and main domes.

In FIG. 2, fuel passes through port 201 and into the center of spool 220 through windows 245 and 244 in sleeve 210 and spool 220 respectively. Fuel passes out of spool 220 to pilot port 202 through window 240 which is positioned over sleeve windows 241. Fuel passes out of spool 220 to main port 203 through main window 242 which is positioned over sleeve windows 243. The window area and, thus the actual flow to the domes is a function of the shape of the sleeve windows and the shape and position of the spool windows relative to the sleeve windows. The fuel split is a function of the ratio of pilot window metering area to main window metering area.

It will be apparent to those of skill in the art that since the relative back pressures in pilot port 202 and main port 203 are normally not equal that the flow split will also be a function of the back pressure difference which may be a function of total fuel flow. Thus, in the present invention, the shape and size of the sleeve windows may be adjusted to compensate for known back pressure characteristics. In addition, the size and shape of the sleeve windows may be adjusted to provide a fail safe feature whereby, even at the extreme range of spool motion, adequate fuel will be available to the combustor domes. Thus, in the present invention, as illustrated in FIG. 6, each pilot and main sleeve window is comprised of a number of smaller metering windows shaped to provide the appropriate flow for maintaining appropriate flow splits and fail-safe limits. These metering windows may include irregular shapes and sizes depending upon system needs.

Flow split is controlled by varying the ratio of the metering areas of the parts in the dividing valves. To accurately set split the ports must to be able to adequately throttle the flow and must drop a significant portion of the total pressure losses in the system, this drives a need for small metering areas at low flow. However, if small metering areas are used to satisfy low flow accuracy the pressure drop in the divider will be unacceptable at high flows, the requirement for small metering areas at low flows and larger metering areas at high flows is satisfied by the use of 2-dimensional windows spool positioning such that the lateral movement of the spool adjusts flow split while rotational movement of the spool adjusts the portion of total pressure drop of the system. Therefore, a divider valve according to the present invention is able to meet the need for high turndown ratio of total flow.

Lateral movement of burner staging spool 220 in FIG. 2 is limited in either direction by first and second physical stops 290 and 292. The control mechanism used to vary the pressures at cavities 262 and 272 (e.g. an electronic or mechanical control) may only move spool 220 within preset limits. The flow split scheduled by burner staging valve 231 at each of the limits is determined by the area ratio of the open sleeve windows (241 and 243) at these limits. Therefore sleeve windows 241 and 243 can be designed to limit the authority of the control mechanism to set flow split. The limits may be set as a function of total system fuel flow. By establishing the limits of the fuel flow splits based on the operability limits of the engine (i.e. turbine temperature limits and flameout limits) fail-safe limits can protect from control system failures.

The metering area of the burner staging valve is, therefore, determined by the combined rotational and transitional inputs to spool 220. The flow split is a function of the area ratio of the divider windows and system back pressure as determined by total flow and flow characteristic of the downstream fuel delivery system, including the fuel nozzles.

The metering valve windows are designed using three constraints; the 'fail-safe' characteristic when on the stops, the system back pressure characteristics and the maximum pressure drop across burner staging valve 231. which raises the pump delivery pressure. A burner staging valve according to the present invention will provide a repeatable flow split. This characteristic may be incorporated into an electronic controller to reliably adjust flow split by adjusting the position of spool 220.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

We claim:

1. A fuel valve comprising
    a main fuel valve connected to a burner staging valve such that fuel flow from the main fuel valve is divided between pilot and main domes of a dual annular combustor;
    said burner staging valve including a movable spool located within a fixed sleeve such that said spool may be moved both laterally and rotated within predetermined limits;
    said movable spool and sleeve including pilot, main and inlet windows arranged such that said inlet windows receive fuel from said main fuel valve and said pilot and said main windows split the fuel flow between said pilot and main domes;
    said burner staging spool being movable within said sleeve such that movement of said spool changes the area of said pilot and said main windows; and
    said sleeve windows comprising groups of small, metering windows adapted to provide predetermined fuel splits for specified spool positions.

2. A fuel valve according to claim 1, wherein:
    said fuel valve includes stops adapted to limit the movement of said spool such that said windows remain open to provide fail-safe operation of the burner staging valve.

3. A fuel valve comprising
    a burner staging valve comprising:
    a movable spool within a fixed sleeve;
    pilot, main and inlet windows within said moveable spool;
    pilot, main and inlet windows within said fixed sleeve wherein said inlet windows are connected to a main fuel valve;
    said main fuel valve being connected to said spool to control rotational movement of said spool;
    said main fuel valve being connected to a fuel pump and regulating the total flow of fuel from said fuel pump to said spool inlet windows; and
    pressure chambers at both ends of said spool, wherein relative pressure differences in said chambers results in lateral movement of said spool.

4. A fuel valve according to claim 3, wherein:
    said pilot and main inlet windows comprise groups of small metering windows.

5. A fuel valve according to claim 4, wherein:
    said pressure chambers receive pressure signals from external sources.

* * * * *